US012603393B2

(12) United States Patent
Chung et al.

(10) Patent No.: US 12,603,393 B2
(45) Date of Patent: Apr. 14, 2026

(54) BATTERY MODULE

(71) Applicant: SK ON CO., LTD., Seoul (KR)

(72) Inventors: Gyu Jin Chung, Daejeon (KR); Majid Abbasi Gharacheh, Daejeon (KR); Yunjo Ro, Daejeon (KR); Seung Hoon Ju, Daejeon (KR)

(73) Assignee: SK On Co., Ltd., Seoul (KR)

( * ) Notice: Subject to any disclaimer, the term of this patent is extended or adjusted under 35 U.S.C. 154(b) by 785 days.

(21) Appl. No.: 17/778,780

(22) PCT Filed: Nov. 20, 2020

(86) PCT No.: PCT/KR2020/016432
§ 371 (c)(1),
(2) Date: May 20, 2022

(87) PCT Pub. No.: WO2021/101300
PCT Pub. Date: May 27, 2021

(65) Prior Publication Data
US 2022/0407187 A1     Dec. 22, 2022

(30) Foreign Application Priority Data

Nov. 20, 2019    (KR) ........................ 10-2019-0149643
Nov. 19, 2020    (KR) ........................ 10-2020-0155110

(51) Int. Cl.
*H01M 50/505*          (2021.01)
*H01M 50/533*          (2021.01)
(Continued)

(52) U.S. Cl.
CPC ....... *H01M 50/505* (2021.01); *H01M 50/533* (2021.01); *H01M 50/534* (2021.01); *H01M 50/536* (2021.01)

(58) Field of Classification Search
CPC ............. H01M 50/505; H01M 50/533; H01M 50/534; H01M 50/536
See application file for complete search history.

(56) References Cited

U.S. PATENT DOCUMENTS

2010/0255351 A1    10/2010    Ijaz et al.
2016/0114429 A1     4/2016    Shioga et al.
(Continued)

FOREIGN PATENT DOCUMENTS

CN        207743312 U      8/2018
EP         3537504 A1      9/2019
(Continued)

OTHER PUBLICATIONS

Minjung Kang, Laser Welding Characteristics of Aluminum and Copper Sheets for Lithium-Ion Batteries, Dec. 2013, Journal of Welding and Joining, vol. 31, No. 6, 58-64 (Year: 2013).*
(Continued)

*Primary Examiner* — Nicole M. Buie-Hatcher
*Assistant Examiner* — Taylor Harrison Krone
(74) *Attorney, Agent, or Firm* — IP & T GROUP LLP

(57)                    ABSTRACT

The present disclosure relates to a battery module comprising: a plurality of battery cells each including an electrode tab; and a bus bar connected to the electrode tab to electrically connect the plurality of battery cells to each other. The bus bar includes a plate having a plurality of holes. The electrode tab of each of the battery cells is inserted into at least a part of the plurality of holes of the plate. The electrode tab inserted into the hole and the plate are coupled to each other by a welding bead, and the welding bead has a width and a height defined by Equations 1 and 2, respectively.

19 Claims, 8 Drawing Sheets

(51) Int. Cl.
        H01M 50/534          (2021.01)
        H01M 50/536          (2021.01)

(56)                    References Cited

U.S. PATENT DOCUMENTS

| | | | | |
|---|---|---|---|---|
| 2016/0315359 | A1 * | 10/2016 | Tyler .................. | H01M 50/507 |
| 2017/0331141 | A1 * | 11/2017 | Schneider .......... | H01M 10/049 |
| 2018/0183020 | A1 * | 6/2018 | Ju ....................... | H01M 50/503 |
| 2019/0296316 | A1 | 9/2019 | Wang et al. | |

FOREIGN PATENT DOCUMENTS

| | | | | | |
|---|---|---|---|---|---|
| JP | 2007109548 | A | * | 4/2007 | ............ Y02E 60/10 |
| JP | 2013-229266 | A | | 11/2013 | |
| KR | 20180074592 | A | | 7/2018 | |
| KR | 10-2018-0116958 | A | | 10/2018 | |
| KR | 10-2018-0133698 | A | | 12/2018 | |
| WO | 2011136580 | A2 | | 11/2011 | |

OTHER PUBLICATIONS

Wang Qilong, Real-time sensing and control of arc welding process quality, Ch. 4 Sensing and control of Welded Seam Size, Nov. 2000, pp. 65-68, Machinery Industry Press (Year: 2000).*

Abioye, Taiwo & Olugbade, Temitope & Ogedengbe, Tunde. (2017). Welding Of Dissimilar Metals Using Gas Metal Arc And Laser Welding Techniques: A Review. 8. 225-228. (Year: 2017).*

Office Action on the Korean Patent Application No. 10-2023-0086701 issued by the Korean Patent Office on Mar. 27, 2024.

Office Action for the Chinese Patent Application No. 202080081096.2 issued by the Chinese Patent Office on Jun. 30, 2023.

Extended European Search Report for the European Patent Application No. 20891250.1 issued by the European Patent Office on Dec. 15, 2023.

Minjung Kang et al., Laser Welding Characteristics of Aluminum and Copper Sheets for Lithium-ion Batteries, Journal of Welding and Joining, Dec. 2013, pp. 58-64, vol. 31, No. 6.

Wang Qilong, Real-time sensing and control of arc welding process quality, Ch. 4 Sensing and control of Welded Seam Size, Nov. 2000, pp. 65-68, Machinery Industry Press.

Office Action for U.S. Appl. No. 19/046,503 issued by the USPTO on Mar. 26, 2025.

M. Weigl et al., Enhancing the Ductility of Laser-Welded Copper-Aluminum Connections by using Adapted Filler Materials, Physics Procedia, 2011, pp. 332-338, vol. 12.

Office Action for U.S. Appl. No. 19/046,503 issued by the USPTO on Jul. 11, 2025.

Tobias Solchenbach et al., Electrical performance of laser braze-welded aluminum-copper interconnects, Journal of Manufacturing Processes, pp. 183-189, Jan. 11, 2014, vol. 16, Issue 2, Elsevier.

* cited by examiner (a)                 (b)

BATTERY MODULE

CROSS-REFERENCE TO RELATED APPLICATIONS

This application is a national stage application of PCT/KR2020/016432 filed on Nov. 20, 2020, which claims priority of Korean patent application number 10-2019-0149643 filed on Nov. 20, 2019 and Korean patent application number 10-2020-0155110 filed on Nov. 19, 2020. The disclosure of each of the foregoing applications is incorporated herein by reference in its entirety.

TECHNICAL FIELD

The present disclosure relates to a battery module, and more particularly, to a battery module having improved mechanical properties and electrical properties.

BACKGROUND ART

Recently, requirements for high-capacity and high-output secondary batteries are increasing, and it is necessary to develop secondary batteries that require high energy density, high performance, and a high level of reliability corresponding to these requirements.

In particular, in the cell-to-cell electrical connection method that requires a high level of reliability, various methods such as ultrasonic welding, laser welding, and mechanical (bolt/nut) bonding have been used. Among them, the laser welding is being used as the most common bonding method to meet increasing energy density requirements.

In a laser welding method, a method of overlap welding of a single or a plurality of electrode tabs and a bus bar is generally used. However, this method has a large deviation in tensile strength after welding, and a high possibility of welding defects such as weak welding depending on the pressurized conditions. As illustrated in FIG. 1, electrode tabs of multiple specifications in a unit module need to be bent and cut for welding, which leads to increased process complexity and manufacturing costs.

In addition, a resistance of each cell is non-uniform due to a difference in lengths of electrode tabs for each cell specification within a module, which is highly likely to adversely affect long-term durability. In particular, using existing laser welding methods is rather difficult to secure stable welding quality (tensile strength, electrical resistance, etc.) in welding electrode tabs to a bus bar, especially when they are made of different materials. For example, prior to the present invention, a stable welding could not be obtained between an aluminum tab and a copper bus bar using existing welding methods.

DISCLOSURE

Technical Problem

An object of the present disclosure is to provide a battery module capable of having a welded part having excellent tensile strength and contact resistance by appropriately controlling welding of heterogeneous materials between an electrode tab and a bus bar.

Objects of the present disclosure are not limited to the above-mentioned objects. That is, other objects that are not mentioned may be obviously understood by those skilled in the art to which the present disclosure pertains from the following description.

Technical Solution

In one general aspect, a battery module includes: a plurality of battery cells each including an electrode tabs; and at least one bus bar connected to the electrode tabs of the battery cells to electrically connect the plurality of battery cells to each other, wherein the bus bar includes a plate in which a plurality of holes are formed, the electrode tabs of the battery cells are inserted into at least a part of the plurality of holes of the plate, the electrode tab inserted into the hole and the plate are coupled to each other by a welding bead, and the welding bead satisfies Equations 1 and 2 below.

$$0 < W < 7T \qquad \text{[Equation 1]}$$

In Equation 1, W is a width of the welding bead based on a cross section of the welding bead in a thickness direction of the plate, and T is a thickness of the electrode tab.

$$0 < H < 3T \qquad \text{[Equation 2]}$$

In Equation 2, H is a height of the welding bead based on the cross section of the welding bead in the thickness direction of the plate, and T is the thickness of the electrode tab.

W may be 2T to 6T, and H may be 0.5T to 2T.

In another aspect, a battery module includes: a plurality of battery cells each including an electrode tabs; and at least one bus bar connected to the electrode tabs of the battery cells to electrically connect the plurality of battery cells to each other, wherein the bus bar includes a plate in which a plurality of holes are formed, the electrode tabs of the battery cells are inserted into at least a part of the plurality of holes of the plate, the electrode tab inserted into the hole and the plate are coupled to each other by a welding bead, and the welding bead satisfies Equation 3 below.

$$0 < A < 21T^2 \qquad \text{[Equation 3]}$$

In Equation 3, A is a cross-sectional area of the welding bead based on a cross section of the welding bead in a thickness direction of the plate, and T is a thickness of the electrode tab.

A may be $T^2$ to $12T^2$.

The welding bead may further satisfy Equation 4 below.

$$0.4T \leq D \leq 2T \qquad \text{[Equation 4]}$$

In Equation 4, D is a penetration depth of the welding bead into a hole based on the cross section of the welding bead in the thickness direction of the plate, and T is the thickness of the electrode tab.

The electrode tab and the plate may be made of different materials from each other.

The method is particularly effective in securing stable welding between an electrode tab and a bus bar made of different materials. In an embodiment the method secures a stable welding between an aluminum electrode tab and a copper bus bar.

The welding bead may be derived from 70 to 99 wt % of a first base material and a balance of a second base material by using the electrode tab as the first base material for welding and the plate as the second base material for welding.

The electrode tab may be made of aluminum, and the plate may be made of copper.

The plate or the electrode tab may include a surface plating layer.

The surface plating layer may include Ni, Sn, Si, Mg, Fe, Mn, Zn, Cr, Li, Ca, or an alloy thereof.

The thickness of the electrode tab may be 0.2 mm or more.

The thickness of the electrode tab may be 0.2 mm to 1.0 mm.

The thickness of the plate may be 0.5 mm or more.

The welding bead may include: a cover part having a convex shape covering the hole on one of two opposing surfaces in the thickness direction of the plate; and a pillar part charged into the hole, based on the cross section of the welding bead in the thickness direction of the plate.

In the cross section of the welding bead in the thickness direction of the plate, the welding bead may be left-right asymmetrical with respect to a center line of the hole.

In the cross section of the welding bead in the thickness direction of the plate, by setting, as a boundary point, a point where an interface between the welding bead and one of two opposing surfaces in the thickness direction of the plate and a surface of the one surface meet, the welding bead may have left-right asymmetry of a ratio of L1:L2, which is a shortest distance between left and right two boundary points, and the center line of the hole is 1:1.2 to 3.

The plate may include a protrusion region formed around a location where the hole is formed.

The plate may include a tab connection part protruding outwardly of the plate from an outer periphery of the hole.

The hole may include an insertion part having an open side so that the electrode tab is slide-inserted.

The battery cell may be a pouch-type battery cell.

Advantageous Effects

According to the present disclosure of the configuration as described above, it is possible to secure stable welding quality, and in particular, it is possible to provide a high-quality of welded part having an equivalent level of contact resistance and superior tensile strength more than twice compared to the conventional method in case of welding heterogeneous materials of an electrode tab and a bus bar.

In addition, it is possible to reduce a resistance in a module by minimizing a length of an electrode tab, and it is possible to secure and manage stable welding quality by controlling a height, a width, or an area of a welding bead formed after welding to be in a certain range.

In addition, it is possible to secure and manage stable welding quality by managing an element composition of a welded part formed after welding.

DETAILED DESCRIPTION

Hereinafter, a battery module of the present disclosure will be described in detail with reference to the accompanying drawings. Drawings to be provided below are provided by way of example so that the spirit of the present disclosure may be sufficiently transferred to those skilled in the art. Therefore, the present disclosure is not limited to the accompanying drawings provided below, but may be modified in many different forms. In addition, the accompanying drawings suggested below may be exaggerated in order to clarify the spirit and scope of the present disclosure. Technical terms and scientific terms used in the present specification have the general meaning understood by those skilled in the art to which the present disclosure pertains unless otherwise defined, and a description for the known function and configuration unnecessarily obscuring the gist of the present disclosure will be omitted in the following description and the accompanying drawings.

In addition, a singular form used in the specification and the appended claims may be intended to include a plural form unless otherwise indicated in the context.

In this specification and the appended claims, terms such as first, second, etc. are used for the purpose of distinguishing one component from another, not in a limiting sense.

In this specification and the appended claims, the terms "include" or "have" means that features or elements described in the specification are present, and unless specifically limited, and do not preclude the possibility that one or higher other features or components may be added unless specifically limited.

In the present specification and the appended claims, when a part such as a film (layer), a region, a component, etc., is above or on another part, this includes not only the case where a part is directly above in contact with another part, but also a case where another film (layer), another region, or another component is interposed therebetween.

In conventional overlap welding, in particular, welding of a Cu bus bar and an Al electrode tab made of heterogeneous material of Cu—Al, a welding strength (tensile strength) is generally 3.5 kgf/mm$^2$ or more. This is about 70% or more of the tensile strength of 5.5 kgf/mm$^2$ of pure Al, which satisfies the welding strength generally required for products and also satisfies the mechanical strength requirements such as vibration and impact resistance of products.

However, in recent years, the level of mechanical strength required for lithium secondary batteries for automobiles has greatly improved, and it is difficult to secure the safety factor and reliability of products corresponding to the vibration and impact test requirements with the existing welding strength.

Figure 1:
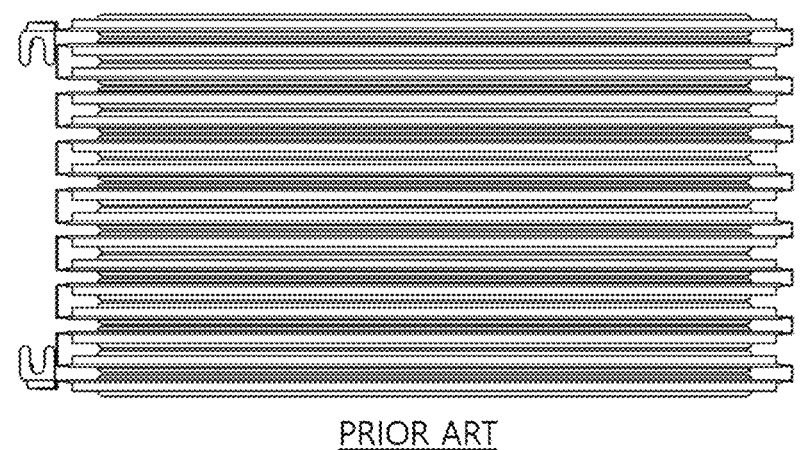
FIG. 1 is a diagram showing a conventional battery module including a "C" shape bus bar.

Therefore, it is urgent to improve the welding strength and secure reliability. In addition, the related art has a large deviation in tensile strength after welding, and a high possibility of welding defects such as weak welding depending on the pressing conditions of electrode tabs. As illustrated in FIG. 1, electrode tabs of multiple specifications in a unit module need to be bent and cut for welding, which leads to increase in process and management costs.

Unlike the related art, the present disclosure may make an electrode tap processing shape of all unit cells constituting a module the same without bending or cutting electrode tabs of a plurality of adjacent cells (battery cells) into more than one shape for welding for electrical connection of the electrode tabs. The processed unit cells are stacked to constitute a laminate including a predetermined number of cells, and then, a plate may be assembled in a direction in which the electrode tabs are inserted for electrical connection. The plate may have holes (for example in the shape of slots), arranged at a predetermined regular interval from each other, through which the pre-processed electrode tabs can be inserted at one end of the holes facing the battery module to a certain depth of the holes, and in some embodiments pass through the holes come out from the side of the holes. The number of the holes (slots) corresponds to the number of the electrode tabs. Also, the shape and size of each hole corresponds to the shape and size of the electrode tabs so that once the tabs are inserted into their respective holes, the clearance between each tab and the surrounding hole is minimized. In an embodiment, the plate may have a protruding surface or region surrounding each hole that protrudes in a direction in which the corresponding electrode tab passes along an outer periphery of the hole.

After assembled in this way, each one of the electrode tabs protrudes through the plate, and then welding is performed by irradiating a laser beam to the protruding welded part of the electrode tab. In this case, since various shapes and qualities of electrode tabs may be formed according to the thickness, material, protruding amount, plate material, plating material, thickness, welding length, welding speed, laser power, and laser irradiation pattern of the electrode tab, the present inventors were able to set the optimal quality control criteria by identifying the degree of influence of various factors through the experiment planning method. The present inventors have investigated the correlation between the mechanical/electrical properties according to the shape of the cross section of the welding bead through repeated research and analysis when welding heterogeneous materials in which the material of the electrode tab and the material of the plate are different, particularly when welding Cu—Al heterogeneous materials, thereby deriving the shape of the welding bead to be described below. When welding the heterogeneous materials, particularly welding the Cu—Al heterogeneous materials, in the case where the welding bead satisfies the shape to be described below, the welding strength may be improved more than twice without deteriorating the electrical properties on the welded part, and the electrical resistance of the module may be reduced. Although not necessarily limited to this analysis, mechanical properties may be improved without substantially deteriorating electrical properties by the composition of the welding bead that varies depending on the external shape of the welding bead and the shape of the welding bead when welding the heterogeneous materials, for example, by Cu—Al dilution in the case of the Cu—Al heterogeneous material.

In general, the dilution represents the degree of contribution of each welding base material (in the case of the present disclosure, the plate and the electrode tab) that contributes to the overall welding with or without filler addition, and in an image of a cross section of welding metal, the dilution may be measured as the area where each component is melted and mixed. It is known that this dilution varies depending on welding heat input, thermal properties, and a shape and dimension of an initial joint.

In the present disclosure, by using the electrode tab as a first base material for welding and the plate as a second base material for welding, the welding bead may be derived from 70 to 99 wt % of the first base material and the balance (1 to 30 wt %) of the second base material and may advantageously be derived from 75 to 99 wt % of the first base material and the balance (1 to 25 wt %) of the second base material. That is, the dilution of the first base material may be 85 to 99% and the dilution of the second base material may be 1 to 15%, and advantageously, the dilution of the first base material may be 89 to 99% and the dilution of the second base material may be 1 to 11%. In this case, a surface plating layer may be formed on the electrode tab serving as the first base material (welding base material) and/or the plate serving as the second base material. That is, the electrode tab and/or the plate may include the surface plating layer, and in particular, the electrode tab, in which electrical/chemical stability for an electrolyte is to be ensured, may include the surface plating layer. As is known, the surface plating layer for ensuring the electrical/chemical stability for the electrolyte may include Ni, Sn, Si, Mg, Fe, Mn, Zn, Cr, Li, Ca, or an alloy thereof. When the surface plating layer is present on the electrode tab and/or the plate, the dilution of the surface plating layer itself may also be calculated through the elemental weight % (wt %) analysis of the welding bead containing the above-described first base material, second base material, and plating component.

The composition of the welding metal (welding bead) throughout the welding may be quantified by energy dispersive spectroscopy (EDS) for various process factors. Table 1 below summarizes the composition content (wt %) of the welding metal under various welding conditions through preliminary experiments and the calculated dilution when welding the heterogeneous materials of the Cu plate-Al electrode tab. The method of calculating the dilution is well known in the art, and therefore, will not be presented separately.

TABLE 1

| Al tab thickness (mm) | Cu range (wt %) | Average Cu content (wt %) | Si + Ni (wt %) | Si + Mg + Fe + etc (wt %) | Al (wt %) | Calculated range of Cu dilution (%) |
|---|---|---|---|---|---|---|
| 0.4 | 18~42 | 27~37 | ∠2.5 | ∠3 | Rest | 6~18 |
| 1.1 | 3~15 | 5~11 | ∠2.5 | ∠3 | Rest | 1~5 |

As a result of testing the mechanical properties on the welded part at various dilutions as shown in Table 1, it was confirmed that Cu, i.e., the welding metal having a composition in which the dilution of the plate is greater than 11%, exhibited significant intermetallic compound (IMC) formation and occurrence of cracks, and it was also confirmed that the composition and dilution of the welding metal may be controlled through the thickness of the aluminum electrode tab.

Meanwhile, it was found that the size of the welding bead is a very important indicator to determine the overall composition and dilution. Specifically, the size of the welding bead is directly related to the load-bearing capacity of the welding metal. Specifically, when welding the heterogeneous materials of the Cu plate-Al electrode tab, it generally means that, as the size of the welding bead increases, more Al is contained, and it was found that the Cu dilution and the IMC formation were reduced and thus the occurrence of cracks is reduced, resulting in forming the stronger welded parts. Based on the research results including these preceding experiments, the present disclosure has a welding strength of 7.0 kgf/mm² or more, which is more than twice the existing overlap welding strength of 3.5 kgf/mm², and the present disclosure is presented by determining the specific conditions of the welding bead in which stable welding quality is achieved by minimizing the occurrence of intermetallic compounds (IMC) such as $Al_xCu_x$ or $Cu_xAl_x$.

Hereinafter, the present disclosure will be described in detail with reference to the accompanying drawings.

Figure 2:
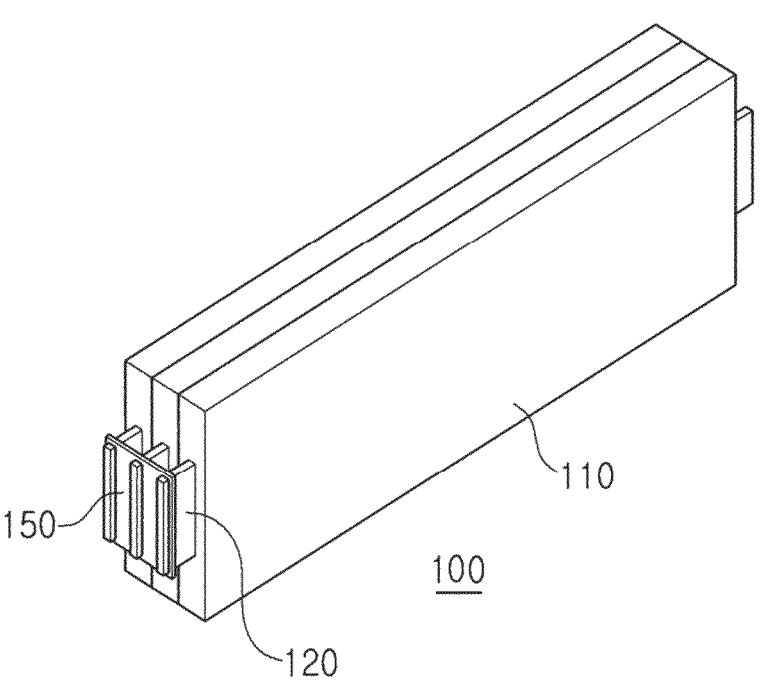
FIG. 2 is a diagram illustrating a battery module according to an embodiment of the present disclosure.
Figure 3:
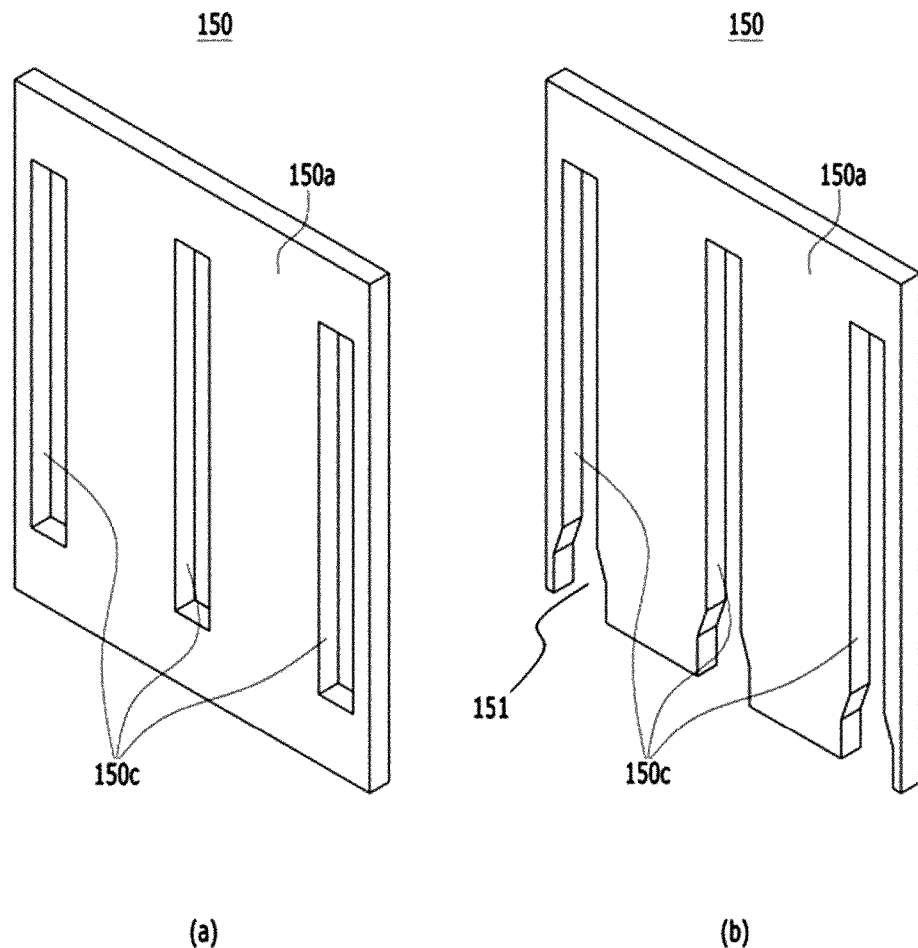
FIG. 3 is a diagram illustrating a bus bar constituting the battery module according to the embodiment of the present disclosure.

FIG. 2 is a diagram illustrating a structure in which the battery tabs 120 of each battery cell 110 are electrically connected by a bus bar 150 in a laminate in which the battery cells 110 are stacked according to an embodiment of the present disclosure. FIG. 3 is a diagram illustrating a bus bar 150 provided in a battery module according to an embodiment of the present disclosure.

As illustrated in FIGS. 2 and 3, the battery module 100 according to the embodiment of the present disclosure includes a plurality of battery cells 110 and electrode tabs 120 drawn out from the battery cells 110.

As illustrated in FIG. 3A, the battery module 100 of the present disclosure includes the bus bar 150, and the bus bar 150 includes a plate 150a including a plurality of holes 150c formed in the plate 150a. In this case, the plate 150 includes three holes 150c, each hole being shaped to accommodate a corresponding electrode tab 120 from the plurality of electrode tabs 120. Each hole 150c has a slit-shape that is sized to correspond to a cross section of the electrode tab 120 so that an end portion of an electrode tab 120 can be inserted into the hole 150c.

In the example illustrated in FIG. 3B, each hole 150c may include an insertion part 151 having one side open to allow the electrode tab 120 to be slide-inserted into the hole 150c. For example, the insertion part 151 may have a tapered shape that widens toward the open side so that the electrode tab 120 may be easily slide-inserted into the hole 150c, however, the shape of the insertion part 151 is not limited to this shape only. When both end portions of the hole 150c are blocked as illustrated in FIG. 3A, the electrode tab 120 may be inserted into the hole 150c of the plate 150a in the protruding direction of the electrode tab 120, and when one end portion of the hole 150c is open as illustrated in FIG. 3B, the electrode tab 120 may be inserted into the hole 150c of the plate 150a in a standing direction (width direction) of the electrode tab through the insertion part 151.

Although there are three holes 150c in each of the bus bars 150 shown in FIGS. 3a and 3b, it is noted that the present invention disclosure is not limited by the number of holes 150c in each of the bus bars 150. Hence, generally, one or more holes 150c may be formed in each of the plates 150a, and each of the electrode tabs 120 may be inserted into a corresponding hole 150c and welded to the bus bar 150. This way the plurality of welded battery cells 110 may be electrically connected to each other through the bus bar 150.

Figure 4:
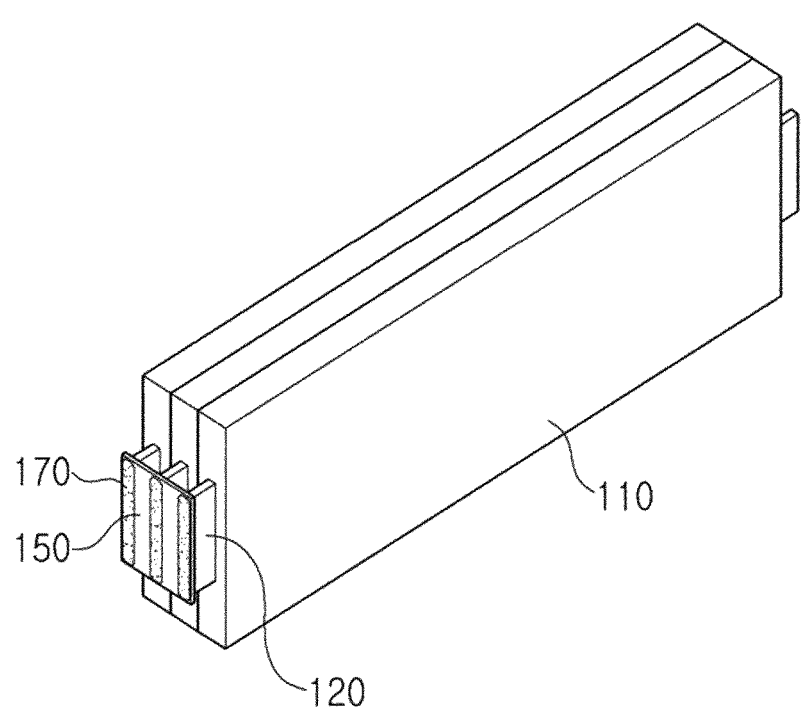
FIG. 4 is a diagram illustrating a battery module having a welding bead according to an embodiment of the present disclosure.

FIG. 4 is a diagram illustrating a battery module including a plurality of battery cells 110 and a plurality of electrode tabs 120 protruding from opposite sides of the battery module. Each of the electrode tabs 120 on a side of the battery module are shown to be coupled to bus bar 150 via a welding bead 170. In the battery module, according to the present disclosure, each electrode tab 120 is inserted into a corresponding one of the holes 150c formed in the plate 150a of the bus bar 150, and then the electrode tabs 120 are connected by welding to the bus bar 150. Thus, the electrode tabs 120 of the electrode cells 110 can be electrically connected without having to separately deform the shape of the electrode tabs 120 as in the related art.

In the present disclosure, one or more holes 150c may be formed in the plate 150a to correspond to the number of battery cells 110 to be connected. Therefore, in order to electrically connect the battery cells 110, the battery cells 110 may be electrically connected without changing the shape of the electrode tabs 120, regardless of the number of battery cells 110 to be connected.

That is, in the present disclosure, the plate 150a constituting the bus bar 150 includes a plurality of holes 150c spaced apart from each other at a predetermined regular interval. The shape, size, and positioning of the holes 150c are such so that the bus bar can be readily positioned on the side of the battery module with the protruding electrode tabs 120 so that each electrode tab 120 can be inserted tightly inside a corresponding hole 150c. Then by welding of the electrode tabs 120 inside their respective holes 150c the plurality of battery cells 110 can be electrically connected to the bus bar 150 and to each other. In this manner, since the electrode tabs 120 are inserted and welded into each hole 150c, the plurality of battery cells 110 welded through the bus bar 150 are electrically connected to each other. In the illustrated embodiment of the present disclosure, the holes 150c having an elongated rectangular shape are referred to as a slit or slot shape. However, the invention is not limited to this shape, but includes shapes and sizes that tightly surround the electrode tabs 120.

Figure 5:
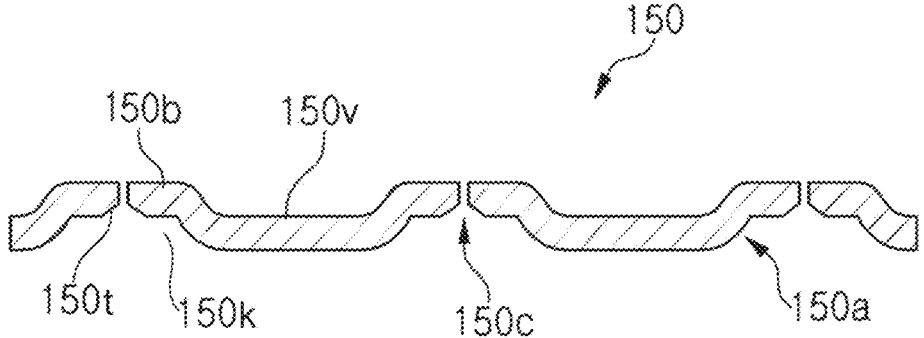
FIG. 5 is a diagram illustrating a bus bar according to another embodiment of the present disclosure.

FIG. 5 is a diagram illustrating a bus bar 150 according to another embodiment of the present disclosure. As illustrated in FIG. 5, the plate 150a of the bus bar 150 has a plurality of protrusion regions 150b separated by valley regions 150v. The holes 150c are formed centrally on the protrusion regions 150b. Stated differently, the protrusion regions 150b are formed around the positions where the holes 150c are formed. The bus bar 150 as shown in FIG. 5 has three protrusion regions 150b and two valley regions 150v. Each protrusion region 150b forms a cavity 150k on the side facing the battery cells 110 of the battery module. Each hole 150c has a tapered section 150t at a first end thereof which faces the cavity 150k and the battery cells 110 of the battery module. The tapered section 150t increases the opening of the hole 150c in the direction toward the battery cells 110. The cavity 150k of the protrusion region 150b and the tapered section 150t serve to guide the electrode tab 120 to be inserted into the hole 150c. Therefore, in the embodiment of FIG. 5, the plate 150a of the bus bar 150 includes the plurality of holes 150c formed at a predetermined regular interval from each other, and includes a corresponding number of protrusion regions 150b formed around the holes 150c.

Figure 6:
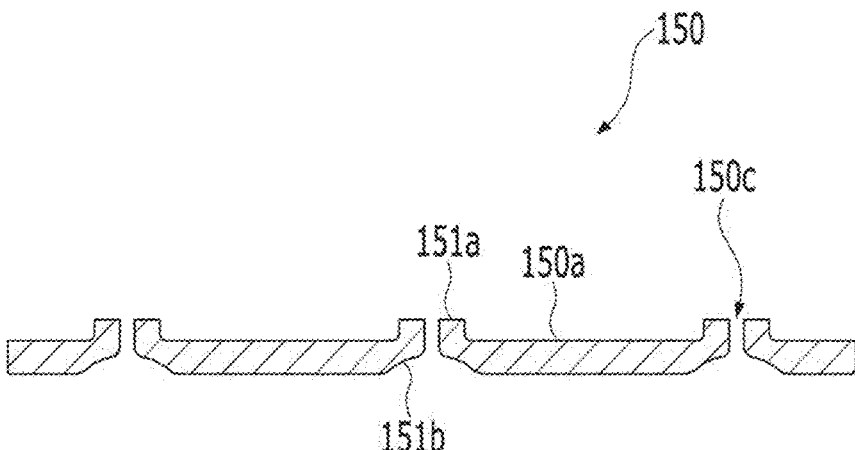
FIG. 6 is a diagram illustrating a bus bar according to another embodiment of the present disclosure.

FIG. 6 is a diagram illustrating the bus bar 150 according to another embodiment of the present disclosure. As illustrated in FIG. 6, the plate 150a according to another embodiment of the present disclosure includes a plurality of tab connection parts 151a corresponding in number to the holes 150c. Each tab connection part 151a is formed to protrude from the outer periphery of a corresponding hole 150c in the direction in which the electrode tab 120 protrudes from the side of the bus bar 150 facing away of the battery cells 110. Then, when the battery cells 110 are electrically connected to each other by laser welding, the electrode tab 120 melted by the laser L may contact the tab connection part 151*a* to be electrically connected to the bus bar 150. In this case, an cavity 151*b* is formed on the opposite surface of the tab connection part 151*a* around the hole 150*c* to guide the electrode tab 120 to be inserted into the hole 150*c*. The cavity 151*b* has a smoother spherical profile than the cavity 150*k* of the embodiment of FIG. 5. Also, the tab connection part 151*a* is generally smaller than the protrusion region 150*b* of the embodiment of FIG. 5.

Figure 7:
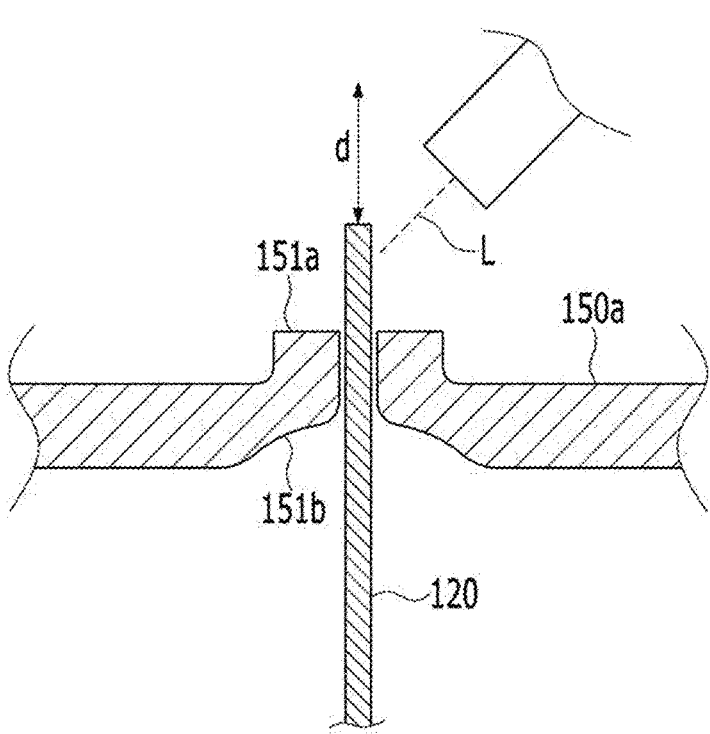
FIG. 7 is a diagram illustrating a state in which a laser L is irradiated with respect to a longitudinal direction dl of an electrode tab according to another embodiment of the present disclosure.

FIG. 7 is a diagram illustrating a state in which a laser L is irradiated in a longitudinal direction "d", i.e., the direction of extension of the electrode tab 120 according to another embodiment of the present disclosure. As illustrated in FIG. 7, the laser L is irradiated obliquely with respect to a central axis of the protruding electrode tab 120 inserted into the hole 150*c* in a longitudinal direction d. Accordingly, when the electrode tab 120 is irradiated perpendicularly to a distal surface of the electrode tab 120, the laser L is directly irradiated to the battery cell 110 due to an error during welding and the possibility that an accident may occur may be minimized. In addition, as the laser L is irradiated obliquely, the welding process of the distal surface of the electrode tab 120 may be confirmed with the naked eye, thereby improving the quality and production speed of the manufacturing method for the battery module.

In the battery module of the present disclosure, after the electrode tab 120 penetrates through the hole 150*c* of the plate 150*a*, welding beads of various shapes may be formed by laser welding. As described above, the present inventors have found that the shape and size of the welding bead are closely related to the composition of the welding metal based on the dilution of the base material, and were confirmed that the mechanical properties including the tensile strength of the welding site may be greatly improved without deteriorating the electrical properties when the welding bead has a specific shape and size as described in this disclosure.

Based on this finding, in one aspect of the present disclosure, the electrode tab inserted into the hole and the plate are coupled to each other by the welding bead, and the welding bead has a width W and a height H that satisfy Equations 1 and 2 below.

$$0 < W < 7T \qquad \text{[Equation 1]}$$

In Equation 1, W is a width of the welding bead based on a cross section of the welding bead in a thickness direction of the plate, and T is a thickness of the electrode tab.

$$0 < H < 3T \qquad \text{[Equation 2]}$$

In Equation 2, H is a height of the welding bead based on the cross section of the welding bead in the thickness direction of the plate, and T is the thickness of the electrode tab. Hence, T may be measured in millimeters "mm".

Figure 8:
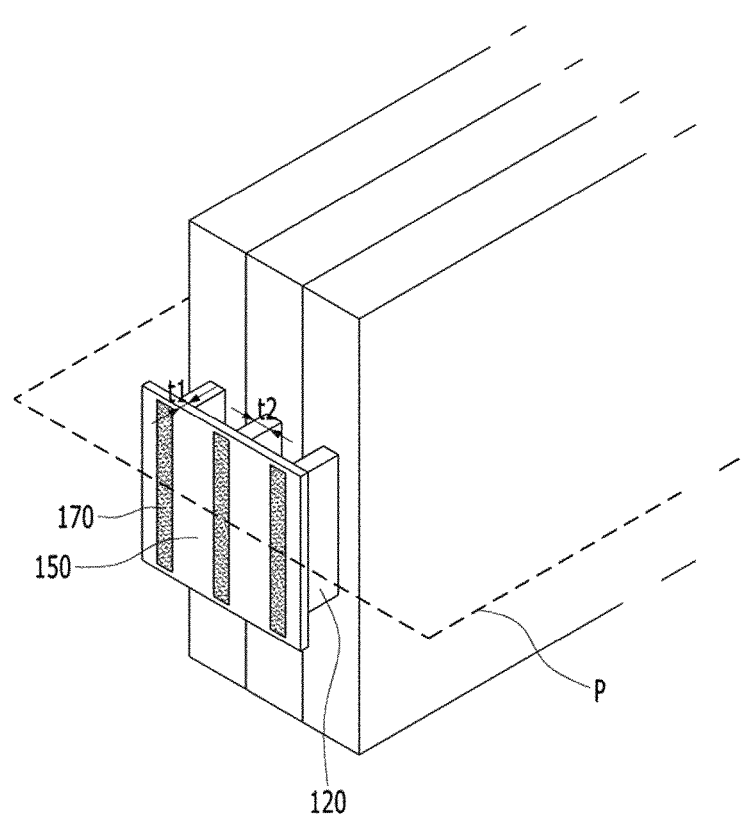
FIG. 8 is a diagram illustrating an imaginary surface for making a cross section of a welding bead in a thickness direction of a plate according to another embodiment of the present disclosure.

Specifically, the cross section of the welding bead in the thickness direction of the plate means a cross section cut by an imaginary plane parallel to the thickness direction of the plate (imaginary plane having the thickness direction as in-plane), but may mean the cross section of the welding cut so that the area of the welding bead is minimized. As a practical example, as in the example illustrated in FIG. 8, an imaginary plane p making the cut cross section of the welding bead may be an imaginary plane that is parallel to a thickness direction t1 of the plate and parallel to a thickness direction t2 of the electrode tab, and the cross section of the welding bead may mean a cross section cut by the above-described imaginary plane p.

Equations 1 and 2 described above are particularly important when the electrode tab and the plate are made of different materials (metal materials). That is, when the width W of the welding bead is 7T or more in the heterogeneous material welding, the formation of the intermetallic compounds between the heterogeneous materials may be induced. As a more practical example, in the case where the electrode tab is made of aluminum and the plate (bus bar) is made of copper, when the width of the welding bead is 7T or more, the melting amount of the Cu plate (bus bar) increases and the formation of the intermetallic compound on the Cu—Al interface is induced, so the deterioration in the quality of the welded part, such as microcracks in the welded part and increased resistance, may be induced. In addition, when the height H of the welding bead is 3T or more, the penetration depth is lowered, which may cause a problem in that the interfacial bonding strength between the heterogeneous materials is weakened. That is, Equation 1 is a geometrical parameter that greatly affects the dilution between the welding base metals in the welding bead, and Equation 2 is a geometrical parameter that greatly affects the shape of the welding bead itself.

For example, the welding bead includes: a cover part 171 having a convex shape covering the hole on one of two opposing surfaces in the thickness direction of the plate, based on the cross section of the welding bead in the thickness direction of the plate; and a pillar part 172 charged into the hole. When the molten metal derived from the welding base materials is cooled to form the welding bead during the welding, not only the composition of the welding bead but also the shape of the welding bead itself including the cover part 171 and the pillar part 172 also affects the mechanical properties of the welded part. Equation 2 is a geometrical parameter that affects the shape of the welding bead itself, and when the height H of the welding bead is 3T or more, the length of the pillar part 172 of the welding bead is shortened, which may cause a problem in that the interfacial bonding strength decreases.

Advantageously, to ensure the stable welding quality, the width W of the welding bead may be 2T to 6T, more advantageously 3T to 6T, and the height H may be 0.5T to 2T, more advantageously 1T to 2T. When the width and height of the welding bead are satisfied, the welding bead has improved tensile strength and low contact resistance, and thus, exhibit excellent welding properties. Furthermore, when the welding bead satisfies the width and height, even if specific welding conditions such as a heat gradient state caused during welding or specific welding conditions such as a laser irradiation method during welding are changed, it is possible to ensure stable and reproducible constant welding quality (improved welding strength, excellent electrical properties of the welding site, etc.).

The above-described width and height of the welding bead directly affect the cross-sectional area of the welding bead. Accordingly, in another embodiment, the electrode tab inserted into the hole and the plate are coupled to each other by the welding bead, and the welding bead may satisfy Equation 3 below.

$$0 < A < 21T^2 \qquad \text{[Equation 3]}$$

In Equation 3, A is a cross-sectional area of the welding bead based on a cross section of the welding bead in a thickness direction of the plate, and T is a thickness of the electrode tab. In this case, the cross section of the welding bead in the thickness direction of the plate is the same as described above based on Equations 1 and 2 above.

A cross-sectional area A of a welding bead 170 may be less than $21T^2$. If the cross-sectional area is $21T^2$ ($mm^2$) or more, there may be various types of problems such as the increased occurrence of the intermetallic compound (IMC), the decreased welding strength, and the occurrence of cracks in the welded part. More preferably, the cross-sectional area of the welding bead based on the cross section of the welding bead may satisfy $T^2$ to $12T^2$, and more advantageously $3T^2$ to $12T^2$. When the cross-sectional area of the welding bead is satisfied, the welding bead has the improved tensile strength and the low contact resistance, and thus, may exhibit the excellent welding properties, and may exhibit the constant welding properties without being substantially affected by the specific welding conditions.

The welding bead may satisfy Equation 1 and Equation 2 and further satisfy Equation 3, and independently, may satisfy Equation 3 and further satisfy Equation 1, Equation 2 or Equation 1 and Equation 2.

Figure 9:
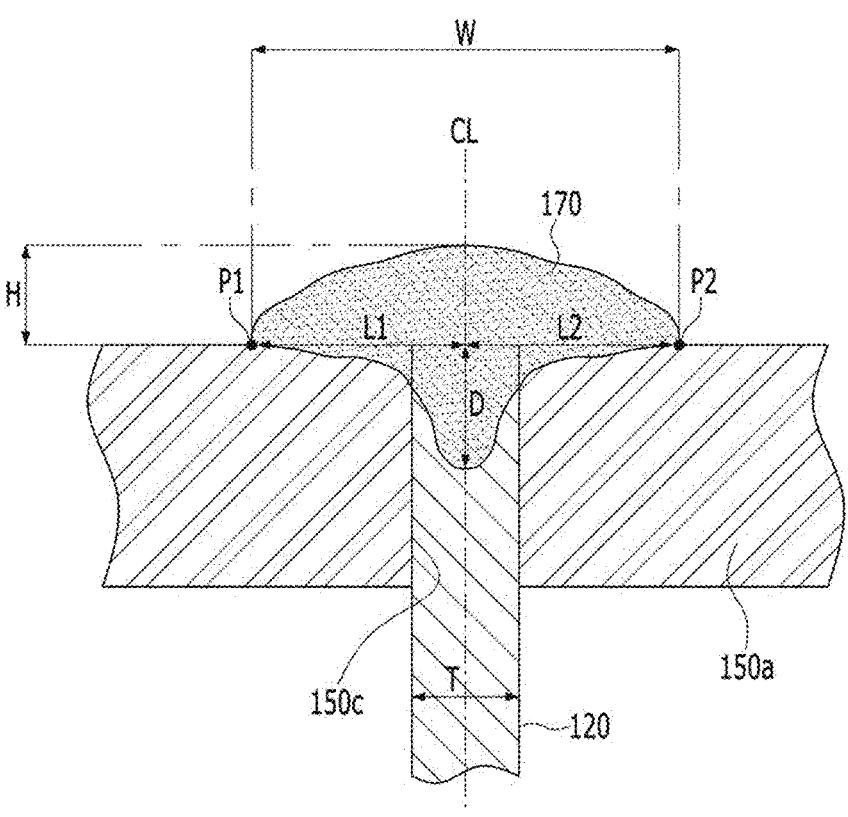
FIG. 9 is a schematic cross-sectional diagram illustrating that the welding bead is formed together with the plate by heating and melting an end portion of an electrode tab, which penetrates through a hole of the plate according to the embodiment of the present disclosure, with a laser.

FIG. 9 is a schematic cross-sectional view illustrating that the welding bead 170 is formed by heating and melting an end portion of the electrode tab 120 that has penetrated through the hole 150c of the plate 150a of the bus bar 150 according to the embodiment of the present disclosure.

As illustrated in FIG. 9, the width W of the bead may be the width of the cover part 171 based on the cross section of the welding bead. Specifically, the width W of the bead may mean a distance between left and right boundary points p1 and p2 by setting, the boundary points p1 and p2, a point where an interface between the welding bead 170 and one of the two opposing surfaces in the thickness direction of the plate 150a and a surface of the one surface meet in the cross section of the welding bead in the thickness direction of the plate. In this case, in the example illustrated in FIG. 9, when the left and right boundary points p1 and p2 are located at the same height, the width of the bead is illustrated as in FIG. 9, and when the left and right boundary points p1 and p2 are not located at the same height, the width of the bead may be defined as the shortest distance between the two boundary points.

As illustrated in FIG. 9, the height H of the bead may be the maximum height of the cover part 171 based on the cross section of the welding bead. Specifically, the height H of the bead may be a distance (shortest distance) between the imaginary line connecting the left and right boundary points p1 and p2 and a highest point of the cover part 171 by setting, the boundary points p1 and p2, the point where the interface between the welding bead 170 and one of the two opposing surfaces in the thickness direction of the plate 150a and the surface of the one surface meet in the cross section of the welding bead in the thickness direction of the plate. In this case, since the example illustrated in FIG. 9 is a case where the left and right boundary points p1 and p2 are located at the same height, the width of the bead is only illustrated as in FIG. 9, and the height of the bead may be defined as the shortest distance between the imaginary line connecting the two boundary points and the highest point of the cover part 171.

In one embodiment, the welding bead may further satisfy Equation 4.

$$0.4T \leq D \leq 2T \qquad \text{[Equation 4]}$$

In Equation 4, D is a penetration depth of the welding bead into the hole based on the cross section of the welding bead in the thickness direction of the plate, and T is the thickness of the electrode tab. For example, the penetration depth may be a distance (shortest distance) between the imaginary line connecting the left and right boundary points p1 and p2 and the lowest point of the welding bead located inside the hole. The penetration depth may correspond to the length of the pillar part 172. The penetration depth may be a factor related to the mechanical properties and the dilution of the plate due to the shape of the welding bead itself. When the penetration depth satisfies a penetration depth of 0.4T to 2T, preferably 0.5T to 1.5T, and more preferably 0.5T to 1.0T, the dilution of the plate is controlled to 5% or less and the mechanical properties may be improved by the shape of the welding bead.

In one embodiment, in the cross section of the welding bead in the thickness direction of the plate, the welding bead 170 may be left-right symmetrical or left-right asymmetrical with respect to a center line CL of the hole. In this case, as the battery tab is inserted into the hole, the center line of the hole may be the same as the center line of the battery tab inserted into the hole. Referring to FIG. 9, the left-right symmetry may mean that the ratio of L1:L2 is 1:1 to 1.2 by setting the shortest distance between the left and right two boundary points p1 and p2 and the center line of the hole as L1 and L2, and setting the longer length as L2 when L1 and L2 are different from each other. Referring to FIG. 9, the left-right asymmetry may mean that the ratio of L1:L2 exceeds 1:1.2, specifically, the ratio of L1:L2 is 1:1.2 to 3, specifically 1:1.2 to 2.5. The left-right asymmetric structure may be mainly affected by the irradiation direction of the laser, and as described above based on FIG. 7, such asymmetric structures may appear when the laser is irradiated obliquely. It is known that the left-right asymmetric structure of the welding bead is not favorable to the mechanical properties of the welding site. However, according to one embodiment of the present disclosure, when the parameters of the bead width, the bead breadth, or the cross-sectional area of the bead are satisfied, the mechanical properties (welding strength) of the welding site are not significantly affected by the asymmetric structure of the welding bead. That is, even with the left-right symmetrical structure or the left-right asymmetrical structure, welding characteristics having substantially constant and uniform and improved mechanical properties may be exhibited.

In an advantageous example, the electrode tab material-plate material may be an Al material-Cu material or a Cu material-Al material. In this case, the Al material may be aluminum having a purity of 90% or more, and specifically, aluminum having a purity of 95% or more, 99% or more, or 99.5% or more. For example, the Al material may be industrial pure aluminum, and commercial products may include Al1000 series (UNS #) such as Al1050, Al1100, or Al1200. The Cu material may be copper with a purity of 98% or more, 99% or more, or 99.3% or more. As an example, the Cu material may be industrial pure copper, and commercial products may include C10100 to C13000 series (UNS #), such as C11000, C10100, C10200, and C12500.

In the present disclosure, the electrode tab 120 is configured to penetrate through the hole 150c in a direction perpendicular to the surface of the plate 150a, and the thickness thereof is preferably 0.2 mm or more. More preferably, the thickness of the electrode tab may be 0.2 to 1.0 mm. When the electrode tab has a thickness of 0.2 mm or more, it is advantageous because the welding bead having the above-described specific shape may be manufactured by the laser welding and the welding bead having a plate dilution of 11% or less may be manufactured.

In addition, in the present disclosure, the plate 150a preferably has a thickness of 0.5 mm or more, and may have, for example, a thickness of 0.5 mm to 10 mm, 1 mm to 8 mm, or 1 mm to 6 mm, but is not necessarily limited thereto.

In one embodiment, the battery cell may be a pouch-type battery cell. The pouch-type battery cell may be a battery cell in which an electrode assembly including a cathode, an anode, and a separator interposed between the cathode and the anode is sealed in a pouch in the state of being impregnated in an electrolyte (electrolytic solution). The pouch may have a multi-layer film structure in which a metal film such as an aluminum film is interposed between an outer film and an inner film, but is not limited thereto. In the battery module according to one embodiment, the electrode tabs of each of the plurality of pouch-type battery cells stacked in one direction are inserted and welded into each hole of the plate, so the plurality of pouch-type battery cells may be electrically connected to each other.

Figure 10:
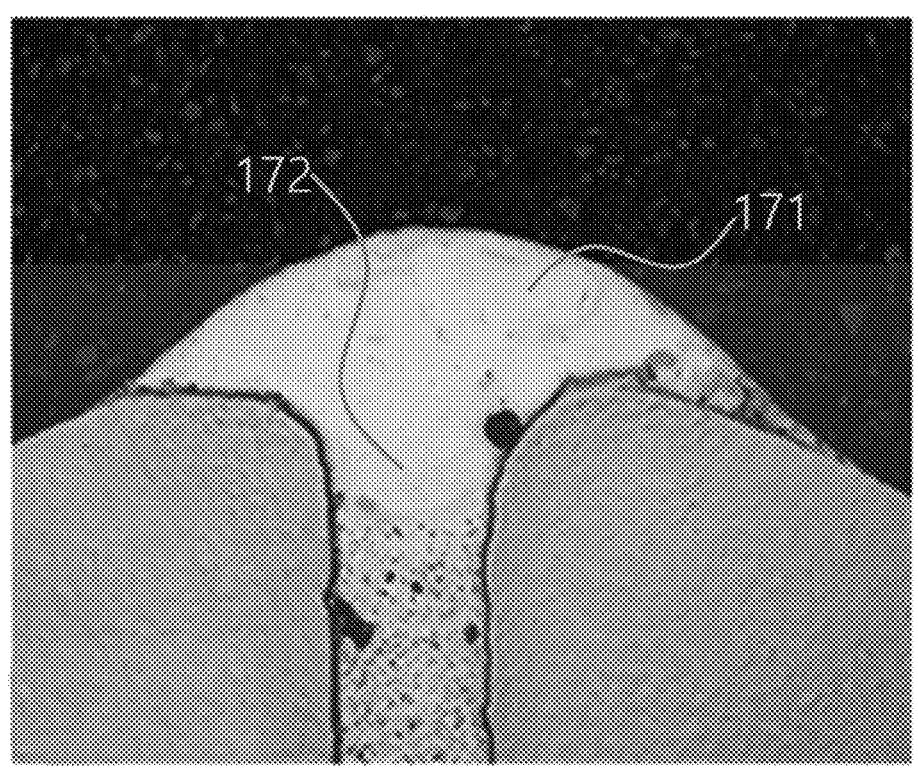
FIG. 10 is a photograph illustrating a shape of the welding bead when an Al electrode tab is welded to a Cu bus bar with heterogeneous materials by the method of FIG. 7.

FIG. 10 is a photograph illustrating the shape of the welding bead according to the embodiment of the present disclosure formed by welding the Al electrode tab to the Cu plate with the heterogeneous materials by the method of FIG. 7. As shown in FIG. 10, it can be seen that the surface of the plate in contact with the welding bead is inclined downward in the longitudinal direction toward the outer peripheral portion of the welding bead. In this way, the surface of the plate bonded to the formed welding bead is configured so that the hole is inclined downwardly from the center toward the outer peripheral portion of the welding bead, and thus, the shape of the welding bead may be smoothly formed, thereby preventing the deterioration in the welding strength due to the rough shapes such as notch.

Hereinabove, although the present disclosure has been described by specific matters such as detailed components, embodiments, and the accompanying drawings, they have been provided only for assisting in the entire understanding of the present disclosure. Therefore, the present disclosure is not limited to the embodiments. Various modifications and changes may be made by those skilled in the art to which the present disclosure pertains from this description.

Therefore, the spirit of the present disclosure should not be limited to these embodiments, but the claims and all of modifications equal or equivalent to the claims are intended to fall within the scope and spirit of the present disclosure.

The invention claimed is:

1. A battery module, comprising:
a plurality of battery cells each including an electrode tab; and
at least one bus bar connected to the electrode tab of each of the battery cells to electrically connect the plurality of battery cells to each other,
wherein the bus bar includes a plate in which a plurality of holes are formed,
the electrode tab of each of the battery cells is inserted into at least a part of the plurality of holes of the plate,
the electrode tab inserted into the hole and the plate are coupled to each other by a welding bead, and
the welding bead satisfies Equations 1 and 2 below, $$2T \leq W < 7T \qquad \text{[Equation 1]}$$

wherein in Equation 1, W is a width of the welding bead based on a cross section of the welding bead in a thickness direction of the plate, and T is a thickness of the electrode tab, $$0.5T \leq H < 3T \qquad \text{[Equation 2]}$$

wherein in Equation 2, H is a height of the welding bead based on the cross section of the welding bead in the thickness direction of the plate, and T is the thickness of the electrode tab, wherein the electrode tab and the plate are made of different materials, and
wherein the welding bead includes: a cover part having a convex shape covering the hole on one of two opposing surfaces in the thickness direction of the plate, and a pillar part charged into the hole, based on the cross section of the welding bead in the thickness direction of the plate.

2. The battery module of claim 1, wherein W is 2T to 6T, and H is 0.5T to 2T.

3. The battery module of claim 1, wherein the welding bead further satisfies Equation 4 below, $$0.4T \leq D \leq 2T \qquad \text{[Equation 4]}$$

wherein in Equation 4, D is a penetration depth of the welding bead into a hole based on the cross section of the welding bead in the thickness direction of the plate, and T is the thickness of the electrode tab.

4. The battery module of claim 1, wherein the welding bead is derived from 70 to 99 wt % of a first base material and a balance of a second base material by using the electrode tab as the first base material for welding and the plate as the second base material for welding.

5. The battery module of claim 1, wherein the electrode tab comprises aluminum, and the plate comprises copper.

6. The battery module of claim 1, wherein the thickness of the plate is 0.5 mm or more.

7. The battery module of claim 1, wherein the plate includes a protrusion region formed around a location where the hole is formed.

8. The battery module of claim 1, wherein the plate includes a tab connection part protruding outwardly of the plate from an outer periphery of the hole.

9. The battery module of claim 1, wherein the hole includes an insertion part having an open side so that the electrode tab is slide-inserted.

10. The battery module of claim 1, wherein the battery cell is a pouch-type battery cell.

11. The battery module of claim 1, wherein the plate or the electrode tab includes a surface plating layer.

12. The battery module of claim 11, wherein the surface plating layer includes Ni, Sn, Si, Mg, Fe, Mn, Zn, Cr, Li, Ca, or an alloy thereof.

13. The battery module of claim 1, wherein the thickness of the electrode tab is 0.2 mm or more.

14. The battery module of claim 13, wherein the thickness of the electrode tab is 0.2 mm to 1.0 mm.

15. The battery module of claim 1, wherein in the cross section of the welding bead in the thickness direction of the plate, the welding bead is left-right asymmetrical with respect to a center line of the hole.

16. The battery module of claim 15, wherein in the cross section of the welding bead in the thickness direction of the plate, by setting, as a boundary point, a point where an interface between the welding bead and one of two opposing surfaces in the thickness direction of the plate and a surface of the one surface meet, the welding bead has left-right asymmetry of a ratio of L1:L2, which is 1:1.2 to 3,
wherein L1 is a shortest distance between a left boundary point and the center line of the hole and L2 is a shortest distance between a right boundary point and the center line.

17. A battery module, comprising:
a plurality of battery cells each including an electrode tab; and at least one bus bar connected to the electrode tab of each of the battery cells to electrically connect the plurality of battery cells to each other, wherein the bus bar includes a plate in which a plurality of holes are formed, the electrode tab of each of the battery cells is inserted into at least a part of the plurality of holes of the plate, the electrode tab inserted into the hole and the plate are coupled to each other by a welding bead, and the welding bead satisfies Equation 3 below, $$T^2 \leq A < 21T^2 \qquad \text{[Equation 3]}$$

wherein in Equation 3, A is a cross-sectional area of the welding bead based on a cross section of the welding bead in a thickness direction of the plate, and T is a thickness of the electrode tab, wherein the electrode tab and the plate are made of different materials, and wherein the welding bead includes: a cover part having a convex shape covering the hole on one of two opposing surfaces in the thickness direction of the plate, and a pillar part charged into the hole, based on the cross section of the welding bead in the thickness direction of the plate.

18. The battery module of claim 17, wherein A is $T^2$ to $12T^2$.

19. A battery module, comprising:

a plurality of battery cells, each battery cell having an electrode tab protruding from opposite sides thereof and forming a first plurality of electrode tabs on a first side of the battery module which are spaced apart from each other at a first regular interval; and a bus bar including a plurality of holes spaced apart at a second regular interval, wherein the first and second regular intervals are the same, wherein the electrode tabs in the first plurality of electrode tabs are each inserted in a corresponding one of the plurality of holes of the bus bar, and coupled to the bus bar by a welding bead, and wherein the welding bead satisfies Equations 1 and 2 below, $$2T \leq W < 7T \qquad \text{[Equation 1]}$$

wherein in Equation 1, W is a width of the welding bead based on a cross section of the welding bead in a thickness direction of the bus bar, and T is a thickness of the electrode tab, and $$0.5T \leq H < 3T \qquad \text{[Equation 2]}$$

wherein in Equation 2, H is a height of the welding bead based on the cross section of the welding bead in the thickness direction of the bus bar, and T is the thickness of the electrode tab, wherein the electrode tab and the bus bar are made of different materials, and wherein the welding bead includes: a cover part having a convex shape covering the hole on one of two opposing surfaces in the thickness direction of the bus bar, and a pillar part charged into the hole, based on the cross section of the welding bead in the thickness direction of the bus bar.

* * * * *